(12) United States Patent
Kapur et al.

(10) Patent No.: US 6,476,180 B1
(45) Date of Patent: Nov. 5, 2002

(54) PROCESS FOR PRODUCING AN ORIENTED SHAPED ARTICLE

(75) Inventors: Vivek Kapur, Kennett Square, PA (US); Kenneth Wayne Leffew, Kennett Square, PA (US); Govindasamy Paramasivam Rajendran, Boothwyn, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/998,538

(22) Filed: Nov. 30, 2001

(51) Int. Cl.[7] .................................................. C08G 63/02
(52) U.S. Cl. ....................................... 528/272; 528/271
(58) Field of Search ................................... 528/271, 272

(56) References Cited

U.S. PATENT DOCUMENTS

| 4,403,090 A | 9/1983 | Smith |
| 4,643,925 A | 2/1987 | Smith et al. |
| 6,150,454 A | 11/2000 | Wu et al. |

FOREIGN PATENT DOCUMENTS

| JP | 10-279784 A | 10/1998 |
| JP | 11-322968 A | 11/1999 |

Primary Examiner—Terressa M. Boykin (57) ABSTRACT

A process for producing an oriented shaped article that comprises the steps of (a) forming a shaped article comprising a block copolymer comprising 75% to 90% by weight of polyethylene terephthalate blocks and 10% to 25% by weight of polyethylene isophthalate blocks and (b) biaxially stretching the shaped article to a planar stretch ratio of 10 to 30.

12 Claims, 1 Drawing Sheet

PROCESS FOR PRODUCING AN ORIENTED SHAPED ARTICLE

FIELD OF THE INVENTION

This invention relates to oriented shaped articles. More specifically, this invention relates to a process for forming oriented shaped articles comprising a block copolymer comprising 75% to 90% by weight of polyethylene terephthalate blocks and 10% to 25% by weight of polyethylene isophthalate blocks.

BACKGROUND OF THE INVENTION

Polyethylene terephthalate (PET) resin is used in the packaging industry, including the production of containers for containing a wide variety of carbonated and non-carbonated fluids. The barrier properties of the container are often critical, particularly in the carbonated beverage industry, where bottlers are concerned about the rate at which the container allows carbon dioxide to escape from the container. If carbon dioxide escapes too rapidly, the beverage will go flat on the shelf before it can be sold and used by the consumer.

Among the improvements which have been disclosed in recent years is the incorporation of varying amounts of polyethylene isophthalate (PEI) into polyethylene terephthalate resins. The resulting PEI/PET resins have been found to have improved barrier properties over that of PET containers and, thus, have led to increases in the shelf life of many products. For oriented shaped articles requiring a longer shelf life, PEI has been used as a barrier layer in a multi-layer container or as a blend with PET in single-walled containers.

U.S. Pat. No. 4,403,090 to Smith discloses a method for making block copolyesters by separately forming isophthalic and non-isophthalic polyesters, melt blending the polyesters, and then polymerizing the melt blend in the solid state. Though detailed solid state polymerization conditions are provided, no specific methods beyond the foregoing are disclosed for making and orienting the block copolymers.

U.S. Pat. No. 4,643,925 to Smith et al. discloses a high molecular weight polyester resin prepared by solid state polymerizing a melt blend of PET and PEI homopolymers. Prepolymers of the component polymers having an inherent viscosity of at least 0.3 are first melt blended, solidified into pellets or chips, crystallized, and then solid state polymerized at about 5° C. to 20° C. below the sticking temperature of the pellets.

U.S. Pat. No. 6,150,454 to Wu et al. discloses a copolyester composition made from a random copolymer of isophthalic and terephthalic acids, a nucleating agent, and a chain-branching agent. It is stated that the chain-branching agent is added to reduce the natural stretch ratio of the copolymer resins to about the stretch ratio levels of commercially available PET resins. The copolymers in Wu et al. are produced by combining the acids, glycols, branching agents, and nucleating agents in the melt and polymerizing to form the branched, random copolymers of patentees invention. Wu et al.'s disclosure is limited to up to 10% of PIA comonomer. It is well known in the art that the mechanical integrity of containers made of random TA/IA copolymers deteriorate rapidly with increasing amounts of the IA moiety above 10%.

The Japan Patent Application Publications H10-279784 and H11-322 968 to Kawano disclose making rigid containers having improved barrier properties using block copolymers formed from PEI and PET moieties. Kawano explicitly teaches forming containers by blow molding employing the same average planar stretch ratio for PET homopolymer resins and the block PEI/PET copolyester resins of Kawano's invention. The planar stretch ratios taught by Kawano are those in widespread commercial use for PET homopolymer.

There is a need for additional methods of forming oriented shaped articles that have low permeability to gas molecules.

SUMMARY OF THE INVENTION

The invention provides a process for producing an oriented shaped article. The process comprises the steps of (a) forming a shaped article comprising a block copolymer comprising 75% to 90% by weight of polyethylene terephthalate blocks and 10% to 25% by weight of polyethylene isophthalate blocks and (b) biaxially stretching the shaped article to an average planar stretch ratio of 10 to 30.

In one embodiment, the polyethylene terephthalate used in the process of the invention is a branched polyethylene terephthalate. In another embodiment, the block copolymer has a randomness factor of 0.3–0.7, and in another embodiment, the randomness factor of the block copolymer is 0.4 to 0.6. In yet another embodiment, the block copolymer has an intrinsic viscosity of at least 0.6 dl/g. In another embodiment, the block copolymer has an intrinsic viscosity of at least 0.7 dl/g. In yet another embodiment of the invention, the copolymer comprises 15% to 20% by weight of polyethylene isophthalate blocks.

The oriented shaped article, in one embodiment, is a film. In another embodiment, the oriented shaped article is a container. In yet another embodiment, the oriented shaped article is a bottle suitable for holding carbonated liquids.

In one embodiment, the step of biaxially stretching comprises blow molding. In another embodiment, the process further comprises the step of (c) heat setting the article.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying figures. It is emphasized that, according to common practice, the various features of the figures are not to scale. On the contrary, the dimensions of the various features are arbitrarily expanded or reduced for clarity.

DETAILED DESCRIPTION OF THE INVENTION

The process of the invention includes the formation of a shaped article comprising a block copolymer of PET and PEI. The portion of PEI blocks in the copolymer resin can vary from a minimum of 1% to a maximum of 30% by weight. In one embodiment, the block copolymer comprises 75% to 90% by weight of polyethylene terephthalate blocks and 10% to 25% by weight of polyethylene isophthalate blocks. In another embodiment, the copolymer comprises 15% to 20% by weight of polyethylene isophthalate blocks.

Figure 1:
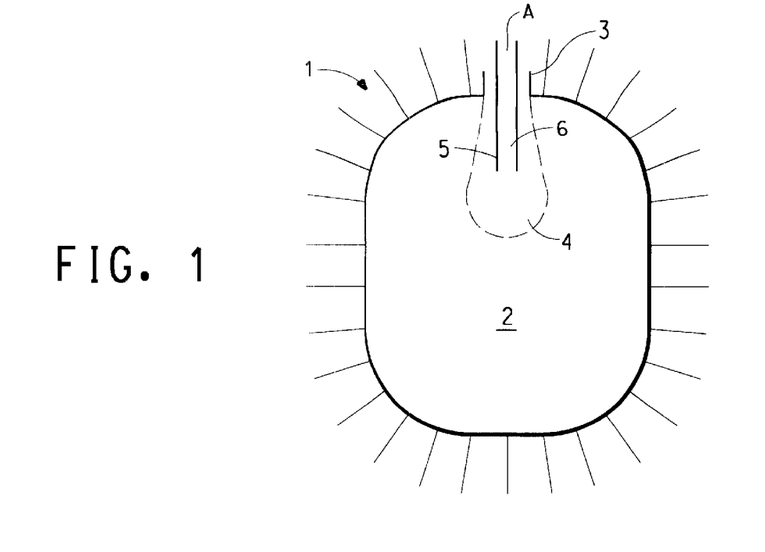
FIG. 1 shows a schematic of a typical apparatus employed for blow molding containers.

One embodiment contemplated in the present invention is the blow-molding of containers, particularly bottles for carbonated beverages. The elements of a typical blow-molding process, well-known in the art, are shown schematically in FIG. 1. An externally heated steel mold 1, having a bottle-shaped cavity 2, has inserted therewithin via an opening in the cavity 3, a parison 4 of PET/PEI block copolymer suitable for use in the present invention, into the center of which parison 4 is disposed an air-inlet tube 5 permitting air 6 to be introduced into the heated parison in the direction of arrow A, thereby causing the parison to expand until the mold is filled, after which the bottle is released and cooled.

The block copolymers should have a high molecular weight suitable for making rigid oriented shaped articles, such as rigid containers. The intrinsic viscosity (IV) should be at least 0.6 dl/g.

The copolymers of the invention have a randomness factor in the range 0.3 to 0.7. In one embodiment, the randomness factor is 0.4 to 0.6. The greater the randomness factor, the greater the randomness of the polymer chain. A statistically random copolymer structure has a randomness factor of 1.0.

The shaped article made using the copolymer composition of the invention is biaxially stretched to produce an oriented shaped article, such as a film or rigid container. The shaped article produced according to the process of the invention is biaxially stretched to a planar stretch ratio higher than that taught in the art for PEI/PET block copolymers. In one embodiment, the average planar stretch ratio is in the range 10 to 30. In another embodiment, the average planar stretch ration is in the range of 12 to 25. The articles produced according to the process of the invention exhibit good mechanical properties, have a minimum density of 1.35 g/cm$^3$, and a carbon dioxide permeability value of less than 15 cc.mil/100 sq.in.day.atm.

As used herein, the phrase "oriented shaped article" is intended to include those articles formed according to the process of the invention wherein at least some portion of the shaped article exhibits biaxial orientation. Articles exhibiting biaxial orientation are birefrigerant, i.e., have two different light bending powers (indexes of refraction) that depend on the polarization of the light entering the substance. The oriented shaped articles of the invention include bottles, which are not subject to uniform extension during blowing and which, as a result, have portions which are more oriented than other portions.

As used herein, the term "planar stretch ratio" is intended to mean the average planar stretch ratio for those articles that are not uniformly stretched. Such articles include containers, such as bottles. Accordingly, a bottle having a planar stretch ratio of 10 to 30 is intended to mean that the average planar stretch ratio of the bottle, as defined below, is 10 to 30. The planar stretch ratio refers to the factor by which the area of a given surface has been expanded by stretching. One of skill in the art will appreciate that when the term is applied to a flat film, both surfaces of the film will have undergone the same degree of stretching so that the average planar stretch ratio of the film is simply equal to the planar stretch ratio of either surface or, really, both surfaces. One of skill in the art will further appreciate that when the surfaces are curved, as in a blow-molded bottle, the inner surface of the bottle will have undergone a higher degree of stretching than will have the outer surface, the difference being determined by the thickness of the bottle wall. Thus, average planar stretch ratio will represent the average between the inner and outer wall of the curved surface.

PET is a semicrystalline polymer with a melting point (Tm) in the range 250° C. to 265° C. and a glass transition temperature (Tg) in the range 70° C. to 80° C. PET has moderate permeability to gas molecules. PEI is an amorphous polyester with a glass transition temperature of 56° C. to 60° C. PEI has a low permeability to gas molecules, about five times lower than PET.

The block copolyesters suitable for the practice of the present invention can be made by melt blending PET and PEI homopolymers in a suitable weight ratio. The PET homopolymer can be made by a melt phase condensation process using terephthalic acid, ethylene glycol, and antimony oxide as a catalyst. The inherent viscosity of the PET homopolymer can vary from 0.15 to 0.65. The PEI homopolymer can be made by a melt phase condensation process using isophthalic acid, ethylene glycol, and antimony oxide as a polymerization catalyst. The intrinsic viscosity of the PEI homopolymer can vary in the range 0.1 to 0.6. Other conventional catalysts, such as antimony acetate, germanium oxide, or titanium alkoxides, can also be used for the melt phase condensation of the homopolyesters. The amount of catalyst used is typically in the range $10^{-5}$ to $10^{-3}$ moles of catalyst per mole of total acid employed.

The PET and PEI homopolymers used in making the copolymer can be either linear or branched homopolymers. Branching can be introduced in the homopolymers using aromatic tetracarboxylic acids, such as pyromellitic acid. Other tetra- or tri- functional carboxylic acids or carboxylic esters and hydroxy compounds can also be used as branching materials. It is preferred that the branching agents are used in small amounts, such as 0.025 to 0.25 mole percent based on the amount of the dicarboxylic acid or the glycol. When higher amounts of branching agents are employed, excessive cross-linking may occur thereby degrading melt processing and introducing visual physical defects, like "fish-eyes", that affect the clarity of the bottles.

The melt blending of the branched or unbranched PET and PEI homopolymers can be effected using any convenient method known to one of skill in the art. This will include both continuous and batch mixing methods and equipment. Continuous mixing equipment includes but is not limited to single and twin screw extruders, high shear kinetic mixers, Kenix and Koch static mixers, and other static mixing devices known to those skilled in the art. Batch mixers include banbury and brabenders mixers, and mixers of similar design, and roll mills. The separate polymers can be first pellet blended and fed as a dry blend to a melt mixer, or they can be independently fed to a melt mixer. Two melt streams can also be brought together in the mixing device. Twin screw extruders are preferred for the mixing of the resins. Polyester is very sensitive to moisture and the resins may undergo rapid hydrolysis in the melt. Such hydrolytic degradation reduces the molecular weight of the resin. In order to reduce hydrolytic degradation, the resins should be dried thoroughly before melt compounding. It has been found satisfactory in the practice of the invention to dry the PET in an oven overnight at 110° C. to 120° C. under vacuum, and to dry PEI 40° C. in an oven under vacuum for three days. Heating PEI above 40° C. is likely to create some softening and sticking. The homopolymer resins in pellet form can be dry mixed in the solid state for extrusion. Alternately, the resin pellets can be metered precisely straight into the extruder hopper using volumetric or weight loss feeders.

The melt compounding is done at about 15° C. to 50° C. higher than the melting point of the PET resin. The normal melt temperature of the resin is in the range 270° C. to 290° C. Higher melt temperatures degrade the polymers. The different zones of the extruder are set at suitable temperatures so that good mixing of the polymer is achieved and such that the polymer melt exits at the die at a melt compounding temperature. Since PEI is an amorphous polymer and has a softening temperature in the range of 60 to 80° C. the temperature of the first two zones in the extruder, adjacent to the hopper, is maintained at a lower temperature to avoid sticking of the PEI to the barrel. Suitable temperatures may be in the range 100° C. to 230° C. The molten strand of the polymer blend may be quenched in room temperature water and pelletized. The pellets are dried overnight at 90° C. to 100° C. under vacuum in an oven.

The melt blend of the PET and PEI prepolymers is generally converted from the amorphous to the partially crystalline state prior to solid state polymerization. The crystallization is necessary to raise the sticking temperature of the resin. The crystallization of the resins may be carried out by heating to a temperature in the range 120° C. to 150° C. in small batch processes. In continuous large scale processes, somewhat higher temperatures are suitable under inert atmosphere. The time for crystallization can vary from one to three hours.

Alternatively, the melt blend of PEI/PET prepolymers having I.V. of less than 0.4, preferably less than 0.3, can be drop-formed in the form of droplets on a heated stainless steel belt. Such a thermal shock crystallization process for making well crystallized low molecular weight PET homo or copolymer resin is described in U.S. Pat. Nos. 5,510,454, 5,540,868, 5,633,018, 5,714,262, and 5,730,913. The crystallized PEI/PET blends produced according to the thermal shock crystallization method are subjected to solid state polymerization to increase the molecular weight suitable for making bottles. Solid state polymerization is a well known technique and is described in, for instance, F. Pilati in G. Allen et al., Ed., *Comprehensive Polymer Science* Vol. 5, 201–216 (Pergamon Press, Oxford 1989). Solid state polymerization is particularly useful for making higher molecular weight condensation polymers. In general, particles of PEI/PET block copolymers are heated to a temperature below the melting point and dry gas is passed, usually in continuous operation, over and around the particles. At the elevated temperatures, transesterification and polycondensation reactions proceed. The gas can be employed to carry away the volatile products, thereby driving the resin molecular weight higher. Other methods, such as employing a vacuum, may be also used to remove the volatile products. Advantageously and surprisingly, the thermal shock crystallized low molecular weight PEI/PET copolymer may be directly polymerized to high molecular weight. Solid state polymerization of block copolymer may be conducted at temperatures of 210° C. to 215° C., significantly higher than that for a random copolymer being produced from a conventional process, thereby increasing the polymerization rate and decreasing processing time. In thermal shock crystallization there is no need for a lengthy annealing step, which lengthens the overall process time. The PEI/PET copolyesters have an intrinsic viscosity of 0.6 or more after solid state polymerization. Such high molecular weight is necessary for suitable melt viscosity for stretch blow molding operations and also to have sufficient mechanical properties for the bottles. Bottles made using resins having lower intrinsic viscosity exhibit uneven material distribution across the bottle wall and the bottles display poor mechanical properties.

PEI/PET block copolymers suitable for the practice of the present invention exhibit melting points much closer to the crystalline melting point of PET homopolymer than do random copolymers of the same overall composition. For example, a linear PEI/PET block copolymer suitable for use in the present invention having 18% PEI blocks exhibited a melting point of 249° C. whereas a 2% isophthalic acid random copolymer of PET exhibited a melting point of 255° C. and a 15% random isophthalic/terephthalic acid copolymer exhibited a melting point of 216° C. An 18% random copolymer has a peak melting point of 207° C.

The copolyester resins can further incorporate various additives commonly added to polyester such as heat stabilizers, weathering agents, antistatic agents, slip additives, mold releasing agents, pigments, dyes, dispersing agents, toners for improving the color, and additives to reduce reheat time in blow molding operations.

Copolymer Randomness Factor

The polyester resins used in packaging applications are usually based on PET homopolymer or PET copolymer containing less than five mole percent of isophthalic acid as a comonomer. These resins crystallize readily upon cooling from the melt or heating from the glassy state. Hence, low or high molecular weight prepolymers can be easily crystallized to a semi-crystalline resin, having a higher amount of crystallinity, suitable for processing in solid state polymerization reactors.

It is known by those skilled in the art that the incorporation of isophthalic acid as a comonomer in PET resin affects the glass transition temperature, melting point, and crystallinity of the resin. As the amount of isophthalic acid increases, the copolyester melting point and the crystallinity decrease considerably. For example, a random copolyester containing 20 mole percent isophthalic acid has a melting point of 206° C. and 9.5% crystallinity (S. W. Lee et. al., *Polymer* 1999, Volume 40, 7137–7146). This copolyester has lower gas permeability values than PET, but it is very difficult to process into a semi-crystalline resin. The slower crystallization rate and lower amount of crystallinity preclude the use of conventional methods, such as crystallization and solid state polymerization, for increasing the molecular weight of this copolyester.

The block copolyester suitable for the practice of the invention may contain a relatively high amount of isophthalic acid of 10% or more and as much as 25%, and yet it is a semi-crystalline resin with a high degree of crystallinity. This copolyester comprises blocks of readily crystallizable PET chain segments as well as non-crystallizable, or slow-to-crystallize, blocks derived from the transesterification of PET and PEI. Surprisingly, these resins possess crystallization rates and melting points not substantially different from PET homopolymer. Because of their higher crystallization rate and high degree of crystallinity, block copolyesters can be easily crystallized and processed in solid state polymerization reactors to produce high molecular weight resins.

A randomness factor "B" is used to define the structure of the block copolyesters suitable for the practice of the present invention. A randomness factor value of 1.0 indicates that the copolymer is random. Thus, a random copolymer having, for example, repeating units ethyleneterephthalate (T) and ethyleneisophthalate (I) has units T and I randomly in the polymer chain without any periodicity in the arrangement of repeat units. If the value of B is less than 1.0, however, the copolyesters have clusters of I and T units in the form of blocks. The smaller the value of the randomness factor B, the greater the blockiness of the copolymer. The randomness factor does not depend on the ratio of monomers, such as PET and PEI, used in making the copolyesters.

Proton NMR can be used to analyze the randomness factor of the copolymers as reported by W. S. Ha et al., in Journal of Polymer Science: Part B: Polymer Physics, Volume 35 (1997), pages 309–315. When PET and PEI homopolymers are melt blended or solid state polymerized, the resulting transesterification reactions may lead to a copolymer containing the following eight triad species:

III, IIT, TII, TIT, TTT, TTI, ITT and ITI wherein T is ethyleneterephthalate and I is ethyleneisophthalate as recited above. Note that, in a dry polymer blend or in a melt blend where no transesterifications have taken place, one will observe only the III and TTT units. As the transesterification reactions proceed, first IIT and TTI units will be formed, which will be transformed by further reactions to TIT and ITI units. Also note that, although the pair of triads (TII and IIT and TTI and ITT) are sequentially different, an analytical technique such as proton NMR cannot distinguish between the pairs. Therefore, the proton NMR can only measure the sum total of all TII and IIT units and sum total of TTI and ITT units.

Using simple algebra, the number of diad units in a copolymer can be written as follows:

$$X_{TT} = X_{TTT} + X_{TTI}$$

$$X_{TT} = X_{TTT} + X_{ITT}$$

$$X_{TT} = X_{IIT} + X_{TIT}$$

$$X_{II} = X_{III} + X_{IIT}$$

where $X_{xyz}$ represents the mole fraction of xyz triad units and $X_{xy}$ represents the mole fraction of xy diad units. Again, note that, although TI and IT units are sequentially different units, they cannot be distinguished by proton NMR analysis.

By mass balance, the total number of I and T units may be written as follows:

$$X_T = X_{TT} + X_{TI}$$

$$X_I = X_{II} + X_{IT}$$

The proton NMR analysis used can only measure the mole fraction of III, IIT and TIT triad units calculated on the total isophthalic acid basis. The proton NMR analysis also determines the mole fraction of I and T units. Therefore, the mole fraction of diad units calculated on total isophthalic and terephthalic acid basis may be written as:

$$X_{II} = \frac{x_{III}}{\left(1 + \frac{x_T}{x_I}\right)} + \frac{x_{IIT}}{2\left(1 + \frac{x_T}{x_I}\right)}$$

$$X_{TI} = \frac{x_{TIT}}{\left(1 + \frac{x_T}{x_I}\right)} + \frac{x_{IIT}}{2\left(1 + \frac{x_T}{x_I}\right)}$$

$$X_{IT} = \frac{x_{TIT}}{\left(1 + \frac{x_T}{x_I}\right)} + \frac{x_{IIT}}{2\left(1 + \frac{x_T}{x_I}\right)}$$

Thus, $X_{II}$, $X_{IT}$, and $X_{TT}$ can be calculated by measuring $x_{III}$, $x_{IIT}$ and $x_{TIT}$, $x_T$ and $x_I$ from NMR analysis. The conditional probability of finding an I unit next to a T unit, $P_{TI}$, and the conditional probability of finding a T unit next to an I unit, $P_{IT}$, may be written as follows:

$$P_{TI} = \frac{X_{TI}}{X_T}$$

$$P_{IT} = \frac{X_{IT}}{X_I}$$

The measure of randomness of the PEI/PET copolymer can be taken as the sum of $P_{TI}$ and $P_{IT}$ as follows:

$$B = P_{TI} + P_{IT}$$

The randomness factor of the copolymer depends on the residence time for the melt blending of PET and PEI prepolymers. In addition, the randomness factor depends on the time and temperature at which the resin is processed in solid state polymerization reactors. At constant catalyst concentration, increasing the residence time for the melt blending increases the randomness factor for the copolymer. The randomness factor increases gradually with an increase in solid state polymerization time until it reaches a steady state value of less than 1. Generally, copolyesters with lower randomness factors can be made by reducing the time at which prepolymers are melt blended and solid state polymerized to higher molecular weights. The randomness factor of the copolyesters suitable for the practice of the invention varies in the range 0.3 to 0.7.

Oriented Articles and Planar Stretch Ratio

PET or its copolymers, in amorphous and unoriented form, is of little commercial importance because it has low mechanical, thermal, and gas barrier properties. However these properties can be improved greatly by proper orientation and heat treatment. The biaxial orientation of PET leads to chain alignment, viscous flow, strain induced crystallization, and strain hardening. The occurrence of strain induced crystallization provides increased stiffness and resistance to creep, as well as improved barrier properties and other desired dimensional properties. The heat setting of the oriented PET leads to further improvement in crystallinity. The higher crystallinity also improves further the thermal, mechanical, and transport properties.

The blow molded articles of the invention are composed of block PEI/PET copolymers having a randomness factor of 0.3–0.7 which are injection molded into preforms by known methods and stretch blow molded, at a planar stretch ratio in the range 10 to 30, into oriented shaped articles such as rigid containers.

The preforms for making rigid containers are made by injection molding between 260° C. to 275° C. with a molding cycle time of about 30 seconds. A typical preform 10 is provided in FIG. 2, which includes a hemispherical bottom 12, a body 14, a transition 16, and a finish region 18.

Figure 2:
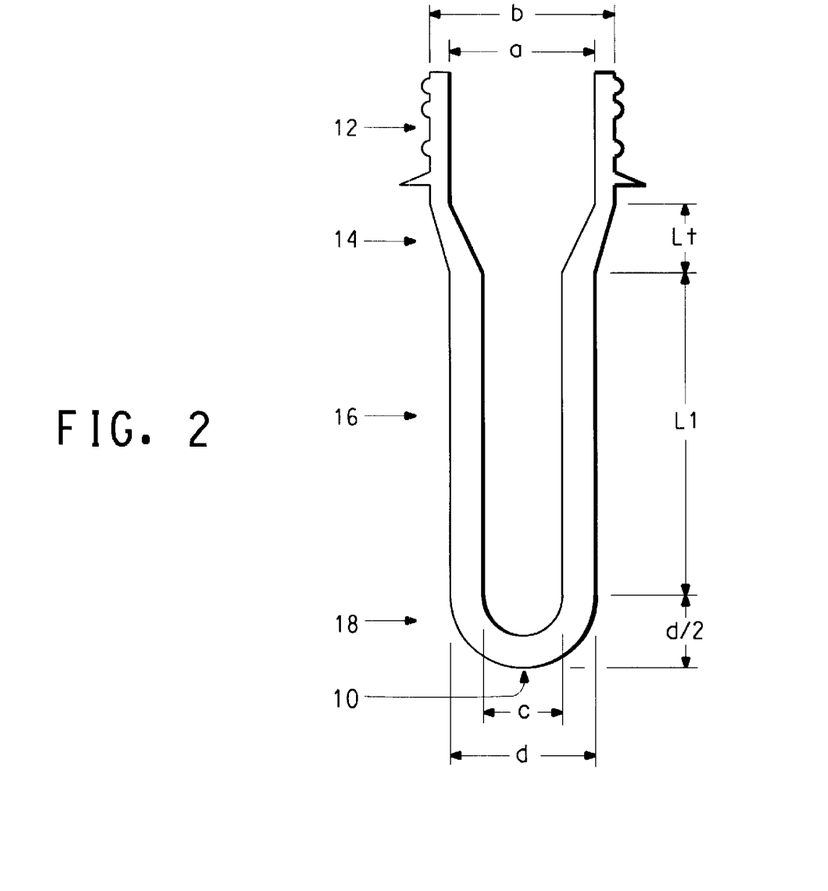
FIG. 2 shows in schematic representation a cross-sectional view of the dimensions of a generic preform.

The preforms suitable for use in the present invention have a lower transition height and higher wall thickness than those of the art because of the requisite higher planar stretch ratio in order to achieve the desirable improvements over the art in the finished product when made according to the process of the present invention. In practice, the preforms used for the block copolymers suitable for the practice of the invention are much shorter and thicker than conventional preforms.

The preforms stretch non-uniformly in the axial and tangential directions on stretch blow molding into bottles. The planar stretch ratio Γ of any infinitely thin element at a given radial position, r, in the preform can be defined as:

$$\Gamma = \gamma^a \frac{R}{r}$$

where $\gamma^a$ is the axial stretch ratio and R is the radius of the blown bottle. Here, an assumption is made that the axial stretch ratio is the same at all radial positions of the preform. The average planar stretch ratio $\langle\Gamma\rangle$ can then be defined as:

$$\langle\Gamma\rangle = \frac{\gamma^a}{(r_o - r_i)} \int_{r_i}^{r_o} \frac{dr}{r}$$

where $r_o$ and $r_i$ are the outer and inner radii of the preform, respectively. Integrating the above equation and simplifying the resulting expression leads to the following equation for the average planar stretch ratio $\langle\Gamma\rangle$:

$$\langle\Gamma\rangle = \gamma^a \frac{\gamma_i^r \gamma_o^r}{(\gamma_i^r - \gamma_o^r)} \ln \frac{\gamma_i^r}{\gamma_o^r}$$

where $\gamma_o^r$ is the tangential stretch ratio of the outer wall and the $\gamma_i^r$ is the tangential stretch ratio of the inner wall.

Heat Setting

The process of the invention can further include the step of heat setting the stretched article to induce additional crystallization. This is usually accomplished by heating the article under constraint to prevent relaxation and shrinkage during heating. A suitable temperature range for heat setting is about 120° C. to 180° C. for about one second to five minutes. Films may be constrained in a frame. Containers are constrained by internal pressure. Just after the preform is blown into a bottle, there is a time delay of a few seconds during which the bottle is held under pressure. The internal pressure forces the bottle against the hot mold wall and prevents the bottle from shrinking. The inside surface of the bottle is then cooled by forcing cold $N_2$ through the bottle before the mold wall is removed and the finished heat set bottle is ejected from the blowmolding machine.

A feature of the invention is that, by biaxially stretching the shaped article to a planar stretch ratio of 10 to 30, the resulting stretched article has a lower permeability and superior mechanical integrity than shaped articles made according to the processes of the art. Under some circumstances, the desired permeability may be achieved without the need for an additional heat setting step after the step of biaxially stretching the shaped article, which would reduce the time needed to produce the product.

In the following examples, certain analytical procedures are used to characterize the polymers. The details of the procedures are described below.

Intrinsic Viscosity (IV): Intrinsic viscosity of the polymer samples was measured by the Goodyear Method R-103B. The polymer solvent was prepared by mixing one volume of trifluoroacetic acid and 1 volume of dichloromethane. 0.10 g of polymer were added to a clean dry vial and 10 mL of the prepared solvent mixture was added using a volumetric pipette. The vial was sealed and shaken for 2 hrs or until the polymer dissolved. The solution so prepared was forced through a flow through capillary rheometer, Viscotek Y900. The temperature for the viscosity measurement was fixed at 19° C.

Density: The density of the films was measured at 23° C. in a density gradient column, made from a solvent mixture of carbon tetrachloride and heptane.

Permeability: The carbon dioxide permeability of biaxially stretched flat films and bottle panels was measured using a MOCON® Permatran-C 440 instrument. All permeabilities were measured at 23° C. Gas permeability of flat films was measured at low gas pressures where the partial pressure difference of $CO_2$ across the film was 1 atm pressure. Permeability of bottle panels was measured at high pressures where the partial pressure difference of $CO_2$ was 5 atm. The high partial pressure difference of $CO_2$ was chosen to simulate the permeation across a carbonated soft drink container. All permeability results reported in the following examples were normalized to 1 atm pressure.

PET prepolymer: Polyethylene terephthalate prepolymer with an IV of 0.20 dl/g was produced on a 100 lb/hr continuous pilot plant facility. A 2:1 molar ratio of ethylene glycol to total diacid was fed to the slurry mixed tank. When standard bottle grade resin was desired, the acid feed consisted of 2% isophthalic acid and 98% terephthalic acid. When pure homopolymer was desired, no IPA was added to the slurry mixed tank. The glycol acid slurry was fed to a recirculating esterifier. The operating temperature in the esterifier ranged between 280° C. and 290° C. and the operating pressure was held at 1 atm. The approximate residence time in the esterifier was 1 hr. The low molecular weight ester drawn from the esterifier had an approximate degree of polymerization of 7 and the acid end concentration was about 800 meq/Kg. The resulting ester was then fed to a high pressure pipeline reactor as described in U.S. Pat. No. 5,811,496. The pressure in the pipeline reactor was controlled at 150 psig. A catalyst solution of antimony glycolate in ethylene glycol was injected into the pipeline reactor such that the final concentration of antimony in the polymer was 275 ppm. The resulting oligomer was further melt polymerized in a countercurrent staged column reactor, a process which is described by U.S. Pat. No. 5,786,443. The pressure in the reactor was held at 1 atm pressure and the operating temperature ranged between 280° C. and 290° C. The residence time of the polymer in the reactor and the flow rate of inert gas were used to control the final molecular weight of the prepolymer exiting the column reactor. The prepolymer melt was then pelletized and shock crystallized on a moving steel belt. The process of thermal shock crystallization and the equipment used are described in U.S. Pat. Nos. 5,540,868 and 5,633,018, respectively. The shock crystallized PET prepolymer was used to prepare block copolymers as described in the following examples. The concentration of the COOH ends in the prepolymer was 215 eq/$10^6$ g.

High molecular weight PET bottle grade resin (Examples 2 and 7 below): The shock crystallized PET prepolymer described in the preceding paragraph was further solid state polymerized to achieve a high molecular weight PET bottle grade resin. The process of solid state polymerization that was used is described in U.S. Pat. No. 5,744,074. The solid state polymerization was carried out in a temperature range of 225° C. to 230° C. The inert gas to solid ratio used in the moving bed SSP reactor was 1:1.

Branched PET prepolymer: Following the same process and equipment as described above, a branched PET prepolymer was prepared, with the exception that a chain branching agent, pyromelletic acid, was added to the polymer. The pyromelletic acid was dissolved in the antimony glycolate solution in the desired proportion and the resulting solution was injected into the pipeline reactor. The concentration of the branching agent in the polymer was kept at 0.09 mole % of the total number of terephthalic acid units present. The final IV of the prepolymer was 0.24 dl/g and the COOH end concentration was determined to be 171 Eq/$10^6$ g.

PEI Prepolymer: Low molecular weight PEI homopolymer was also prepared on the above described 100 lb/hr scale process equipment. A slurry of pure isophthalic acid (no terephthalic acid added to the slurry tank) in ethylene glycol, where the ratio of glycol to acid ratio was 2.0, was fed to the esterifier. The esterifier was operated at atmospheric pressure and in a temperature range of 280° C. to 290° C. The resulting PEI ester was fed to the high pressure pipeline reactor. A solution of antimony glycolate in ethylene glycol was injected into the pipeline reactor. The PEI ester was further polymerized in the column reactor and the resulting molten prepolymer was pelletized by the rotoformer and quenched on the moving steel belt. The amorphous PEI prepolymer pellets were collected for further experiments as described in the following examples. The antimony concentration in the PEI prepolymer was approximately 275 ppm and its IV was 0.3 dl/g. The COOH ends concentration was determined to be 90 $Eq/10^6$ g.

NMR analysis: Polymer was dissolved at 2–4% concentration by weight in a solvent mixture of 3:1 $CDCl_3$:$CF_3COOD$ for NMR analysis. Spectra were taken on a Bruker DRX 500 operating at 500.13 MHz for protons. Eight co-added scans were taken with a 90° C. pulse followed by a 30 second delay between pulses. A total of 32 k data points were taken over a 12,820 Hz spectral window followed by zero-filling to 256 Kk prior to Fourier transformation. The residual $CHCl_3$ peak was referenced to 7.262 ppm.

Spectra were deconvoluted between 7.640 ppm to 7.550 ppm by first creating a peak list and then editing the peak list to include peaks which were present only as shoulders on the main peak. A mixed Gaussian and Lorentzian deconvolution was performed.

Mechanical Properties: Tensile properties were measured from pieces cut in the axial and radial directions from the side panels of 20 oz. bottles. The tensile properties of the panels were measured using ASTM method D882-97.

EXAMPLES

Example 1: PEI/PET Copolymer Made Using High Molecular Weight PET & PEI

This example illustrates the importance of the stretch ratio for producing the PEI/PET copolymers of the invention. Without using an increased stretch ratio over the natural stretch ratio of PET homopolymer, the resulting PEI/PET copolymer does not achieve the enhanced barrier properties resulting from sufficiently increased density and reduced permeability.

Crystar® 3934, a PET homopolymer having an IV of 0.67 available from the DuPont Company, Wilmington, Del. was dried overnight in a vacuum oven at 100° C. A PEI homopolymer having an IV of 0.68 and being made in a batch reactor using an antimony glycolyate by a method well known in the art was dried overnight in a vacuum oven at 40° C. The PET homopolymer (1,580 g) and PEI homopolymer (395 g) were then pellet blended dry before feeding into the hopper and melt extruded in a 28 mm twin-screw extruder at a feed rate of about 4 kg/hr. The different zones in the extruder were heated to the following temperatures for the melt compounding:

| T1 | T2 | T3 | T4 | T5 | Die |
| --- | --- | --- | --- | --- | --- |
| 216° C. | 246° C. | 250° C. | 250° C. | 250° C. | 261° C. |

The molten polymer strand was cooled in room temperature water and pelletized. The pellets were dried at 65° C. overnight in a vacuum oven and crystallized by heating at 110° C., 130° C. and 150° C. each for one hour, under a steady flow of nitrogen.

The crystallized pellet was solid-state polymerized in a 4" solid state polymerization reactor at 205° C. for ten hours to 0.79 IV. This resin was then melted in a 28 mm extruder and the polymer melt was cast on a chill roll maintained at 50° C. into an about 8 mil thick and 12 inch wide film roll. Coupons of 4"×4" were cut from the middle of the roll and then biaxially stretched simultaneously in a T.M. Long Pantograph stretcher at 110° C. using a strain rate of 20000%/minute. The density and permeability are provided below in Table 1.

TABLE 1

| Example | Biaxial Stretch Ratio | Oriented Density (g/cm³) | Oriented Permeability (cc.mil/100 sq.in. day.atm) |
| --- | --- | --- | --- |
| 1A | 4 | 1.3443 | 30.1 |
| 1B | 9 | 1.3617 | 17.4 |
| 1C | 16 | 1.3691 | 14.8 |

*Film was heat-set at 180° C. for 30 seconds.

As shown in Table 1, the density of oriented film increased and the permeability of oriented film decreased as the biaxial stretch ratio was increased from 4 (Example 1A) to 9 (Example 1B) to 16 (Example 1C).

Example 2: Comparative Example With Regular PET Bottle Resin

This example demonstrates that, for PET homopolymer, altering the stretch ratio does not have a significant impact on the density and permeability of the resulting polymer.

The high molecular weight PET bottle grade resin as defined above having an IV of 0.813 dl/g was melt cast into amorphous films and biaxially oriented simultaneously as described in Example 1. The stretching was done at 110° C. using a strain rate of 20000%/min. The density and the permeability of the films are given below in Table 2.

TABLE 2

| Example | Biaxial Stretch Ratio | Density (g/cm³) | Permeability (cc.mil/100 sq.in.day.atm) |
| --- | --- | --- | --- |
| 2A | 4 | 1.3651 | 32.1 |
| 2B | 9 | 1.3670 | 28.4 |
| 2C | 16 | 1.3677 | 25.1 |

As demonstrated by the results of Table 2, the density increased and the permeability decreased as the biaxial stretch ratio was increased from 4 (Example 2A) to 9 (Example 2B) to 16 (Example 2C).

Example 3: Linear PEI/PET Copolymer Made Using Low IV PET & PEI

This example illustrates the randomness factor (B) for linear PEI/PET copolymers. The results indicated that the randomness factor (B) reached a saturation point during solid state polymerization (SSP) beyond which further randomization did not occur.

A PET with an IV of 0.20 dl/g and COOH ends of 215 $Eq/10^6$ g produced by the melt phase polymerization process and which contained approximately 300 ppm antimony as a polymerization catalyst was used as a PET prepolymer. A PEI having an IV of 0.30 dl/g and COOH ends of 90 $Eq/10^6$ g, produced by the same process and containing approximately the same amount of antimony catalyst, was used as a PEI prepolymer. The PET prepolymer pellet was fed using a K-Tron weight loss feeder and the PEI prepolymer pellet was fed using a K-Tron volumetric feeder, at a feed composition of 20% PEI by weight in the blend, straight into the feed zone of the extruder. The melt blend was processed at 300 rpm through a 57 mm twin screw extruder with five heated zones:

| T1 | T2 | T3 | T4 | T5 |
|---|---|---|---|---|
| 100° C. | 160° C. | 260° C. | 290° C. | 290° C. |

The feed zone and the first heated zone were cooled using a chiller operating at −10° C. The molten polymer material was pumped under pressure at a flow rate of 50 lb/hr into a 14.5 cm wide ROTOFORMER® dropformer manufactured by Sandvik Process Systems, Totowa, N.J. The orifices aligned in rows along the ROTOFORMER® were 2.0 mm in diameter. The feed temperature of the molten polymer material was about 285° C. at the entry of the ROTO-FORMER®. The molten polymer material was drop-formed in the form of droplets onto a steel conveyor 12 ft in length, which was also manufactured by Sandvik Process Systems. The steel belt was heated to 120° C. using two sources, a heated roll near the particle former and an electric convection oven downstream of the pellet former and immediately after the roller. The molten polymer droplets solidified on the belt to provide uniform, hemispherical particles which were conveyed to a collection bin.

The particles so collected were further solid polymerized into high molecular weight resin by heating in a (2") solid state polymerization reactor under inert atmosphere. The solid state polymerization reactor consisted of a 2" diameter and 13" long KIMAX® glass pipe fitted with stainless steel flanges at both ends of the tube. This glass tube was encased in a 4.5" Kimax glass pipe. Hot nitrogen was used for heating the particles in the glass column. Hot air was used for heating the annular space between the 2" glass pipe and the 4" glass pipe. The flow of gases was regulated using a high flow rotometer. A SYLVANIA® gas heater was used for heating the gases. The IV of the solid phased particles, provided below in Table 3, depended on the polymerization time and the temperature of the reactor.

TABLE 3

| Polymerization Time (hr) | IV at 205° C., dl/g | IV at 210° C., dl/g | IV at 215° C., dl/g |
|---|---|---|---|
| 0.0 | 0.210 | 0.210 | 0.210 |
| 4.6 | 0.290 | 0.327 | 0.319 |
| 7.7 | 0.339 | 0.366 | 0.391 |
| 24.6 | 0.501 | 0.606 | 0.639 |
| 28.4 | 0.547 | 0.672 | 0.678 |
| 31.9 | 0.576 | 0.657 | 0.705 |
| 40.0 | 0.632 | 0.761 | 0.768 |

The analysis of the proton NMR of the resin indicated a copolymer comprising 82 mole % of terephthalic acid and 16 mole % of isophthalic acid.

The randomness factors (B) of the copolymer was evaluated for the resin solid phased at 215° C. and are provided below in Table 4.

TABLE 4

| Example | SSP Time (min) | Mole % TIT | Mole % IIT | Mole % III | Mole % I | Mole % T | B |
|---|---|---|---|---|---|---|---|
| 3A | 0.0 | 0.2 | 1.4 | 17.5 | 18.9 | 80.1 | 0.06 |
| 3B | 4.6 | 0.5 | 6.5 | 9.8 | 16.6 | 82.6 | 0.27 |
| 3C | 7.7 | 1.0 | 7.1 | 8.3 | 16.3 | 82.8 | 0.34 |
| 3D | 24.6 | 4.4 | 8.5 | 3.5 | 16.5 | 83.5 | 0.63 |
| 3E | 28.4 | 3.9 | 9.9 | 4.8 | 18.6 | 81.4 | 0.58 |

TABLE 4-continued

| Example | SSP Time (min) | Mole % TIT | Mole % IIT | Mole % III | Mole % I | Mole % T | B |
|---|---|---|---|---|---|---|---|
| 3F | 31.9 | 4.4 | 9.6 | 4.1 | 18.0 | 82.0 | 0.62 |
| 3G | 40.0 | 4.1 | 8.2 | 3.2 | 15.5 | 84.5 | 0.62 |

The results in Table 4 indicate that the randomness factor (B) initially increased with an increase in solid state polymerization time (SSP) and then reached a saturation point beyond which there was no further increase in randomization.

Example 4: Branched PEI/PET Copolymer Made Using Low IV Branched PET and Low IV Linear PEI This example illustrates the randomness factor (B) for branched PEI/PET copolymers. The results indicated that the randomness factor (B) generally reached a saturation point during solid state polymerization (SSP) beyond which further randomization did not generally occur.

A branched PET with an IV of 0.240 d/g and COOH ends of 171 Eq/$10^6$ g and containing approximately 300 ppm of antimony catalyst was made by a melt phase polymerization process using 0.1 mole % of pyromellitic acid as a branching agent. In addition, a PEI having an IV of 0.3 d/g and a carboxyl ends of 90 Eq/$10^6$ g produced by the same process and containing approximately the same amount of antimony catalyst was used. A melt blend of PET/16 wt. % PEI composition was made using the conditions reported in Example 3. The IV of the solid phased particles are provided in Table 5. As shown in Table 5, the pastilles solid polymerized at 210° C. for 30 hours produced an IV of 0.75 d/g.

TABLE 5

| Time (hr) | IV at 205° C. | IV at 210° C. | IV at 215° C. |
|---|---|---|---|
| 0 | 0.242 | 0.242 | 0.242 |
| 16 | 0.417 | 0.676 | 0.542 |
| 20 | 0.476 | 0.653 | 0.612 |
| 24 | 0.488 | 0.678 | 0.661 |
| 30 | 0.688 | 0.752 | 0.770 |

The analysis of the proton NMR spectrum of the solid phased polymer corresponded to 84 mole % terephthalic acid and 16 mole % isophthalic acid. The randomness factor (B) of the resin solid phased at 215° C. is given below in the following Table 6.

TABLE 6

| Example | SSP Time (hr) | Mole % TIT | Mole % IIT | Mole % III | Mole % I | Mole % T | B |
|---|---|---|---|---|---|---|---|
| 4A | 0 | 0.00 | 0.00 | 16.72 | 16.6 | 82.5 | 0.00 |
| 4B | 16 | 3.46 | 8.25 | 4.65 | 16.30 | 83.4 | 0.56 |
| 4C | 20 | 2.42 | 7.63 | 5.71 | 15.7 | 84.0 | 0.47 |
| 4D | 24 | 3.46 | 8.55 | 4.62 | 16.6 | 83.0 | 0.56 |
| 4E | 30 | 2.90 | 8.30 | 5.29 | 16.4 | 83.2 | 0.51 |

The results of Table 6 indicate that the randomness factor B was greatest after solid state polymerization for 16 and 24 hr.

Example 5: Free Blown Bottles of PET Homopolymer and PEI/PET Copolymers

This example demonstrates that the PEI/PET copolymers of the invention have a significantly higher natural draw ratio than the PET homopolymer.

The free blow experiments were carried out to determine the natural draw ratio of the PEI/PET block copolymers suitable for use in the present invention and to compare the resulting natural draw ratio to that of PET homopolymer. Three different resins were used: (i) the linear PEI/PET block copolymer resin as described in Example 3; (ii) the branched PEI/PET block copolymer resin as described in Example 4; and (iii) the commercial PET Laser+® which is a random copolymer of TPA with 2% IPA available from E.I. du Pont de Nemours and Company of Wilmington, Del. The details for the polymer resins are provided in Table 7.

TABLE 7

| Polymer | % Isophthalic acid | Initial IV | Final IV | Melting Point |
|---|---|---|---|---|
| Laser+ ® | 2% | 0.84 | 0.82 | 255° C. |
| branched PEI/PET copolymer | 16% | 0.84 | 0.80 | 240° C. |
| linear PEI/PET copolymer | 16% | 0.78 | 0.74 | — |

All resins were dried at 140° C. for at least 4 hrs in Conair dryers. Each of the resins was then used to injection mold a generic 26.5 g, 20 oz. bottle preform illustrated in FIG. 2. The dimensions (in inches) of the preform are provided in Table 8.

TABLE 8

| Closure OD (b) | Closure ID (a) | Transition Height ($L_t$) | Main Body OD (d) | Main Body ID (c) | Main Body length ($L_1$) | Preform Wall Thickness |
|---|---|---|---|---|---|---|
| 1.00 | 0.85 | 0.67 | 0.83 | 0.54 | 2.21 | 0.15 |

The preforms were formed by injection molding in a single cavity Arburg injection molding machine. The temperature of the polymer melt varied between 260° C. and 275° C. The total molding cycle time for all preforms was 30 seconds.

The preforms were allowed to equilibrate at room temperature for 1 day before they were blown. The preforms were free-blown at different temperatures and pressures. Before the free-blowing step, 0.4" diameter circles were marked at three different regions of the preform. The preform was then placed in a preheated convection oven. The temperature of the preform was monitored with the help of a mercury thermometer, which was placed in the preform cavity. When the desired temperature was achieved in the preform, it was quickly transferred to the blowing station where it was blown at a predetermined constant pressure. Before blowing, the surface temperature of the preform was measured by an IR sensor. Since the preforms usually stretch non-uniformly in the axial and the tangential directions (i.e., the tangential stretch is usually greater than the axial stretch), the initial circular marks on the preforms were stretched into ellipses where the minor axis of the ellipse was in the axial direction and major axis was in the tangential direction. The axial and tangential stretch ratio of the outer wall was determined by dividing the major or the minor dimensions of the ellipse by the diameter (0.4") of the initial circle. The stretch ratio of the inner wall was obtained by multiplying the outer wall stretch ratios by the factor $R_o/R_i$, where $R_o/R_i$ is the ratio of the outer diameter to the inner diameter of the preform. The average planar stretch ratio, $\langle \Gamma \rangle$ for a given balloon was calculated using the following equation:

$$\langle \Gamma \rangle = \gamma^a \frac{\gamma_i^r \gamma_o^r}{(\gamma_i^r - \gamma_o^r)} \ln \frac{\gamma_i^r}{\gamma_o^r}$$

wherein $\gamma^a$ is the axial stretch ratio, which is assumed to be the same for the inner and outer surfaces, $\gamma_o^r$ is the tangential stretch ratio of the outer wall and the $\gamma_i^r$ is the tangential stretch ratio of the inner wall.

Table 9 shows the average planar stretch ratio at different temperatures and pressures for the three different resins. Since the temperature along the axis of any given preform was not always uniform, the planar stretch ratios were slightly different at different regions of the balloon. Therefore, the average planar stretch ratio data presented in Table 9 is a mean of the average planar stretch ratio measured at three different positions on the balloon.

TABLE 9

| Polymer | Blow Temp. (° C.) | Blow Pressure (psi) | Average Planar Stretch Ratio |
|---|---|---|---|
| Laser+ ® | | | |
| | 110 | 74 | 13 |
| | 105 | 75 | 12 |
| | 100 | 74 | 11 |
| | 95 | 75 | 11 |
| PEI/PET | | | |
| Branched | 110 | 35 | 22 |
| | 105 | 40 | 20 |
| | 100 | 40 | 17 |
| | 95 | 50 | 16 |
| PEI/PET | | | |
| Linear | 110 | 40 | 24 |
| | 105 | 40 | 21 |
| | 100 | 40 | 18 |

Approximately 4" circular discs were cut out from the walls of the free blown balloons. A MOCON® Permatran C440 unit was used to measure $CO_2$ permeability of different polymer discs. The permeability measured at 23° C. at a $CO_2$ partial pressure difference of 1 atm. for different samples is presented in Table 10.

TABLE 10

| Example | Polymer | Blow Temperature (° C.) | Permeability (cc mil/100 in² day atm) | Density (g/cm³) |
|---|---|---|---|---|
| 5A | Laser+ ® | 110 | — | 1.365 |
| 5B | PEI/PET Branched | 110 | 13.0 | 1.362 |
| 5C | PEI/PET Linear | 110 | 14.5 | 1.362 |

Example 6: Heat Setting of Free Blown Bottle Panels

The example demonstrates that the PEI/PET copolymers of the invention can be heat set and that an additional improvement in the barrier properties of the copolymers is achieved by the heat setting process.

Preforms were injection molded from 16% PEI/PET branched copolymer as described in Example 5. The preforms were heated to 105° C. and free-blown into balloons. Circular discs (6" diameter) which were cut out from the free blown balloons, were constrained in jig, and then heat set by pressing the discs between a hot plate and a cold plate held at room temperature. The temperature of the hot plate was varied at three levels: 120° C.; 160° C.; and 200° C. The heat setting time was also varied between 2.5 sec and 30 sec. Carbon dioxide permeability of the heat set panels was measured at a $CO_2$ partial pressure difference of 75 psia and at 23° C. The $CO_2$ permeability of the 16% PEI/PET branched copolymer of different heat set panels is presented in Table 11.

bottles were blown on a commercial Sidel SBO2 blow molding machine. The dimensions of the generic preform, illustrated in FIG. 2, are presented in Table 14. Also presented in Table 14 are the corresponding stretch ratios obtained when the preforms were blown into a generic 20 oz. straight wall bottle.

TABLE 14

| Preform | Closure OD (b) | Closure ID (a) | Transition Height ($L_t$) | Main Body OD (d) | Main Body ID (c) | Main Body length ($L_1$) | Preform Wall Thickness | Average Planar Stretch Ratio |
|---|---|---|---|---|---|---|---|---|
| 20 oz. generic | 0.982 | 0.856 | 0.551 | 0.849 | 0.54 | 2.01 | 0.15 | 9.69 |

TABLE 11

| Example | Heat Set Temperature (° C.) | Heat Set Time (sec) | Permeability (cc mil/100 in² day atm) | Density (g/cm³) |
|---|---|---|---|---|
| 6A | 120 | 2.5 | 9.9 | 1.358 |
| 6B | 120 | 5.0 | 8.9 | 1.363 |
| 6C | 120 | 30 | 9.7 | 1.366 |
| 6D | 160 | 2.5 | 7.9 | 1.371 |
| 6E | 160 | 5.0 | 7.8 | 1.370 |
| 6F | 160 | 30 | 7.8 | 1.372 |
| 6G | 200 | 2.5 | 7.3 | 1.380 |
| 6H | 200 | 5.0 | 7.6 | 1.377 |
| 6I | 200 | 30 | 7.6 | 1.380 |

The blow molding conditions are listed in Table 15. Note that the IR lamp spacing on the Sidel machine was set at 15 mm. The blown bottles were clear with acceptable material distribution and wall thickness.

TABLE 15

| Preform | Blow rate (Bottles/hr) | # of IR lamps | Preform Temperature | Low pressure (bar) | High pressure (bar) |
|---|---|---|---|---|---|
| 20 oz. generic | 1000 | 7 | 107° C. | 12 bar | 40 bar |

Example 7: Injection Stretch Blow Molding of 20 oz. Control Bottles

This example illustrates a procedure that can be used to injection mold and blow mold PET homopolymer bottles.

The high molecular weight PET bottle grade resin of Example 2 was injection molded and blow molded into 20 oz. generic CSD bottles as a control to compare with PEI/PET copolymer bottles. The compositions of the control sample are provided in Table 12.

The density, permeability and tensile properties were measured for the panels cut from the 20 oz. bottles. The permeability was measured at 23° C. at a $CO_2$ partial pressure difference of 75 psia.

TABLE 12

| Polymer | % Isophthalic acid | Initial IV | Final IV | Melting Point |
|---|---|---|---|---|
| control, PET | 2.0 wt % | 0.81 | 0.76 (preform) | 255° C. |

The control polymer resin was first dried at 170° C. for at least 4 hrs in forced air resin dryers. The dry polymers were then injection molded in a Husky LX160 injection molding machine. The injection molding conditions used for making clear preforms, presented in Table 13, were typical of conditions of PET bottle resins.

Example 8: Injection Stretch Blow Molding of 20 oz. PEI/PET Copolymer Bottles

This example provides injection and blow molding of various preforms and copolymer samples. The results indicate improved barrier properties and adequate mechanical properties of the resulting PEI/PET copolymer bottles.

The linear PEI/PET copolymer of Example 3, but with 18% PEI/PET rather than 16% PEI/PET as used in Example 3, and the branched PEI/PET copolymer of Example 4 were injection molded into a low stretch preform and a high stretch preform. The dimensions of the resulting preforms are presented in Table 16. Also presented in Table 16 are the corresponding stretch ratios obtained when the preforms were blown into a generic 20 oz. straight wall bottle. These preforms were specifically designed to allow for a significantly higher stretch than is possible when conventional 20 oz. PET homopolymer preforms are blown into 20 oz. containers.

TABLE 13

| Preform | Nozzle Temp. | Cycle Time | Injection Pressure | Hold Pressure |
|---|---|---|---|---|
| generic | 280° C. | 15.8 sec | 25% | 13% |

The preforms were allowed to equilibrate at room temperature for at least one day before blow molding. The

TABLE 16

| Preform Design | Closure OD (b) | Closure ID (a) | Transition Height ($L_t$) | Main Body OD (d) | Main Body ID (c) | Main Body length ($L_1$) | Preform Wall Thickness | Average Planar Stretch Ratio |
|---|---|---|---|---|---|---|---|---|
| low stretch | 1.00 | 0.85 | 0.37 | 0.83 | 0.39 | 1.64 | 0.22 | 14.0 |
| high stretch | 1.00 | 0.85 | 0.50 | 0.80 | 0.31 | 1.50 | 0.25 | 16.0 |

The solid state polymerization of both the prepolymer samples was carried out in a continuous moving bed reactor. The sample details are provided in Table 17.

TABLE 17

| Polymer | % PEI | Initial IV | Final IV | Melting Point |
|---|---|---|---|---|
| PEI/PET branched | 16% | 0.84 | 0.78 | 240° C. |
| PEI/PET linear | 18% | 0.80 | 0.74 | 249° C. |

The copolymers were first dried at 170° C. for at least 4 hrs in forced air Conair dryers. The dry polymers were then injection molded in an Arburg single cavity injection molding machine. The injection molding conditions used for making clear preforms are presented in Table 18. Note that these molding conditions were chosen to give dimensionally stable and clear preforms but are not necessarily the optimum conditions for injection molding.

TABLE 18

| Preform | Nozzle Temperature | Cycle Time (sec) | Injection Pressure (bar) | Hold Pressure (bar) |
|---|---|---|---|---|
| low stretch | 280–295° C. | 59–69 | 700 | 725 |
| high stretch | 260–275° C. | 90–100 | 400–450 | 800 |

The preforms were allowed to equilibrate at room temperature for at least one day before blow molding. The bottles were blown on a commercial Sidel SBO2 blow molding machine. The blow molding conditions are listed in Table 19. Note that the IR lamp spacing on the Sidel machine was set at 15 mm. The blown bottles were clear with acceptable material distribution and wall thickness.

TABLE 19

| Preform type | Blow rate (Bottles/hr) | # of IR lamps | Preform Temp | Low pressure (bar) | High pressure (bar) |
|---|---|---|---|---|---|
| low stretch | 1700 | 5 | 107° C. | 15 | 38 |
| high stretch | 1400 | 5 | 120° C. | 15 | 38 |

The density, permeability, and tensile properties were measured for the panels cut from the 20 oz. bottles. The permeability was measured at 23° C. at a $CO_2$ partial pressure difference of 75 psia. The results are presented in Tables 20 and 21.

TABLE 20

Density and Permeability of Bottle Panels

| Example | Bottle resin | Ave. density (g/cm$^3$) | Permeability (cc.mil/100 sq.in day.atm) |
|---|---|---|---|
| 8A | control | 1.363 | 16.80 |
| 8B | linear PEI/PET - low stretch | — | — |
| 8C | linear PEI/PET - high stretch | 1.364 | 9.63 |
| 8D | branched PEI/PET- low stretch | 1.363 | 10.97 |
| 8E | branched PEI/PET - high stretch | 1.365 | 9.80 |

TABLE 21

Tensile Properties of Bottle Panels

| Example | Bottle resin | Axial modulus (Mpa) | Axial yield strength (Mpa) | Radial modulus (Mpa) | Radial yield strength (Mpa) |
|---|---|---|---|---|---|
| 8A | control | 2500 | 82 | 4300 | 191 |
| 8B | low stretch linear PEI/PET | 2600 | 84 | 4300 | 144 |
| 8C | high stretch linear PEI/PET | 3300 | 103 | 5100 | 169 |
| 8D | low stretch branched PEI/PET | 2600 | 90 | 4500 | 139 |
| 8E | high stretch branche PEI/PET | 2700 | 89 | 4700 | 158 |

Although illustrated and described above with reference to specific embodiments, the present invention is nevertheless not intended to be limited to the details shown. Rather, various modifications may be made in the details within the scope and range of equivalents of the claims and without departing from the spirit of the invention.

What is claimed is:

1. A process for producing an oriented shaped article, said process comprising:
    (a) forming a shaped article comprising a block copolymer comprising 75% to 90% by weight of polyethylene terephthalate blocks and 10% to 25% by weight of polyethylene isophthalate blocks; and
    (b) biaxially stretching said shaped article to an average planar stretch ratio of 10 to 30.

2. The process of claim 1 wherein said polyethylene terephthalate is a branched polyethylene terephthalate.

3. The process of claim 1 wherein said block copolymer has a randomness factor of 0.3 to 0.7

4. The process of claim 3 wherein said randomness factor is 0.4 to 0.6.

5. The process of claim 1 wherein said block copolymer has an intrinsic viscosity of at least 0.6.

6. The process of claim 1 wherein said copolymer comprises 15% to 20% by weight of polyethylene isophthalate blocks.

7. The process of claim 1 wherein said average planar stretch ratio is 12 to 25.

8. The process of claim 1 wherein said oriented shaped article is a film.

9. The process of claim 1 wherein said oriented shaped article is a container.

10. The process of claim 9 wherein said container is a bottle suitable for holding carbonated liquids.

11. The process of claim 1 wherein said biaxially stretching comprises blow molding.

12. The process of claim 1 further comprising the step of (c) heat setting said article.

* * * * *